United States Patent [19]

Heyman

[11] Patent Number: 4,922,397
[45] Date of Patent: May 1, 1990

[54] APPARATUS AND METHOD FOR A QUASI-RESONANT DC TO DC BRIDGE CONVERTER

[75] Inventor: Albert M. Heyman, Bedford, Mass.

[73] Assignee: Digital Equipment Corporation, Maynard, Mass.

[21] Appl. No.: 307,138

[22] Filed: Feb. 6, 1989

Related U.S. Application Data

[63] Continuation of Ser. No. 158,117, Feb. 16, 1988, abandoned, which is a continuation of Ser. No. 892,595, Aug. 1, 1986, abandoned.

[51] Int. Cl.$^5$ .......................................... H02M 3/335
[52] U.S. Cl. ........................................ 363/17; 363/48; 363/98
[58] Field of Search ...................... 363/47, 48, 98, 126, 363/17, 21

[56] References Cited

U.S. PATENT DOCUMENTS

| | | | |
|---|---|---|---|
| 3,935,526 | 1/1976 | Kamata et al. | 363/21 |
| 3,953,779 | 4/1976 | Schwartz | 363/28 |
| 4,017,784 | 4/1977 | Simmons et al. | 363/17 |
| 4,024,453 | 5/1977 | Corry | 363/28 |
| 4,138,715 | 2/1979 | Miller | 363/28 |
| 4,158,881 | 6/1979 | Simmons et al. | 363/25 |
| 4,318,164 | 3/1982 | Onodera et al. | 363/21 |
| 4,415,959 | 11/1983 | Vinciarelli | 363/21 |
| 4,441,146 | 4/1984 | Vinciarelli | 363/56 X |
| 4,525,774 | 6/1985 | Kino et al. | 363/98 X |

FOREIGN PATENT DOCUMENTS 0404069 3/1974 U.S.S.R. ............................... 363/21

OTHER PUBLICATIONS

Dixon et al., Proceedings of Powercon 8, "Designing Optimal Multi-Output Converters with a Coupled-Inductor Current-Driven Topology", pp. 1-12, 4/81.

Myers et al., "200-kHz Power FET Technology in New Modular Power Supplies", Hewlett Packard Journal, 8/81, pp. 3-10.

Babu, "A Practical Resonant Converter Using High Speed Power Darlington Transistors", PCI Proceedings, 3/82, pp. 122-141.

Baker, "High Frequency Power Conversion with FET-Controlled Resonant Charge Transfer", PCI Proceedings, 4/83.

Carlsten, IBM Technical Disclosure, "Resonant Zero Crossover DC-to-DC Converter", Jan. 1980, FIGS. 1-4.

Joyce et al., IBM Technical Disclosure, "Current-Mode Regenerative Gate Drive for Power FETS", Oct. 1983, p. 2246.

Primary Examiner—Patrick R. Salce
Assistant Examiner—Kristine Peckman
Attorney, Agent, or Firm—William W. Holloway; T. Carter Pledger

[57] ABSTRACT

A DC to DC converter is described having a bridge circuit coupled to the secondary windings of a transformer, the transformer supplying power to a capacitor and a constant current load source. The circuit parameters are chosen to provide a circuit that has quasi-resonant characteristics close to the frequency of the signal providing power to the transformer, but at a higher value. Other constraints on the circuit parameters are discussed. The resulting circuit provides an efficient transfer of energy from the source power supply to the load.

14 Claims, 2 Drawing Sheets

APPARATUS AND METHOD FOR A QUASI-RESONANT DC TO DC BRIDGE CONVERTER

This is a continuation of co-pending application Ser. No. 07/158,117 filed on Feb. 16, 1988, which was a continuation of application Ser. No. 06/892,595 filed on Aug. 1, 1986 now abandoned.

RELATED PUBLICATIONS AND U.S. PATENTS

The following publications and U.S. Patents are related to the instant invention:

200-KHz Power FET Technology in New Modular Power Supplies, by Richard Myers and Robert D. Peck, Hewlett Packard Journal, Aug. 1981, pages 3 to 10.

A Practical Resonant Converter Using High Speed Power Darlington Transistors, by Sridhar R. Babu, PCI Mar. 1982 Proceedings, pages 122 to 141.

High Frequency Power Conversion with FET-Controlled Resonant Charge Transfer, by R. H. Baker, PCI Apr. 1983 Proceedings, pages 130 to 139.

Electronic Control System for Efficient Transfer of Power Through Resonant Circuits, invented by Francise Carol Schwarz, having U.S. Pat. No. 3,953,779, issued on Apr. 27, 1976.

DC To DC Converter, invented by David Harry Simmons and Paul Calvin Launderville, having U.S. Pat. No. 4,017,784, issued on Apr. 12, 1977.

Inverter For Supplying A Regulated Voltage, invented by Thomas M. Corry, having U.S. Pat. No. 4,024,453, issued on May 17, 1977.

Resonant Switching Converter, invented by Edward J. Miller, having U.S. Pat. No. 4,138,715, issued on Feb. 6, 1979.

DC To DC Converter, invented by David H. Simmons and Alfredo A. Panelo, having U.S. Pat. No. 4,158,881, issued on Jun. 19, 1979.

High Frequency Switching Circuit Having Preselected Parameters To Reduce Power Dissipation Therein, invented by Toshihiro Onodera, Youichi Masuda and Akira Nakajima, having U.S. Pat. No. 4,318,164, issued on Mar. 2, 1982.

Forward Converter Switching at Zero Current, invented by Patrizio Vinciarelli, having U.S. Pat. No. 4,415,959, issued on Nov. 15, 1983.

Optimal Resetting of the Transformer's Core in Single Ended Forward Converters, invented by Patrizio Vinciarelli, having U.S. Pat. No. 4,441,146, issued on Apr. 3, 1984.

BACKGROUND OF THE INVENTION

1. Field of the Invention

This invention relates generally to power supplies, and more particularly, to the type of power supply that converts an input DC voltage to an output DC voltage having a different magnitude.

2. Description of the Related Art

DC to DC converters have the property that a constant input voltage level can be converted to a constant output voltage level having a different magnitude, i.e. a DC input voltage can be converted to a higher DC output voltage or to a lower DC output voltage. In addition, the output voltage can be electrically isolated from the input voltage.

The present invention generally has application in converting higher DC voltage, applied to the DC to DC converter from the power distribution source, to a lower DC voltage. In particular, in a data processing system, the distribution of power at higher voltage levels reduces the $I^2R$ losses and reduces the effect of contact resistances of the distributing conducting path on the voltage level reaching the local power source. The lower DC voltage level from the DC to DC converter is compatible with the requirements of the circuit elements used in the data processing system.

One implementation technique for prior DC to DC converters involves the use of sinusoidal primary and sinusoidal secondary voltages and is referred to as a resonant DC to DC converter. Resonant converter circuits require an inductor, a capacitor and very fast diode clamps in the primary circuit (elements that are not required in the quasi-resonant DC to DC converter circuits described below). The resonant converter circuit has the advantage that the sinusoidal voltages reduce the switching losses in the field effect transistors and that the operation is consistent with high frequency operation. The high frequency operation environment permits the use of physically small transformer components and secondary filter circuit components. However, the high frequency operation also induces high dV/dt transients into the switching circuit causing the field effect transistors to experience gate drive problems. Furthermore, the primary switch device must handle larger than necessary switch currents. The circuit may require a Schottky diode in series with the field effect transistor as well as a high voltage 30 ns, 3 ampere diode in parallel with the Schottky diode and series field effect transistor. The use of resonant circuits can also result in a lack of stability when a high Q circuit is used (i.e. to minimize energy losses.) Finally the use of resonant circuits, with the inherent transfer of energy between components of the tank circuit, is fundamentally inconsistent with the unidirectional delivery of power to the components energized by the DC to DC converter.

More recently, Vinciarelli, in U.S. Pat. No. 4,415,959 and in U.S. Pat. No. 4,441,146 has described a quasi-resonant circuit. In the quasi-resonant circuit configuration, the leakage inductance of the transformer coupling the input and output portions of the converter forms, in combination with an external high Q capacitor, a resonant circuit. A capacitor between the leakage inductance of the transformer and the external capacitor, prevents the actual resonance of the circuit. The resonant frequency of the circuit is typically not the frequency at which the input terminals of the transformer are being activated. In addition, the circuits described in U.S. Patents by Vinciarelli have a single ended configuration, i.e. a single rectifying element in the secondary circuit of the transformer, and consequently operates at reduced power level. In U.S. Pat. No. 4,441,146, a circuit is described that resets the magnetic flux in the transformer arising from the single-ended implementation.

A need has therefore been felt for a DC to DC converter circuit that provides the advantages of the quasi-resonant DC to DC converter without the limitations of the prior devices.

FEATURES OF THE INVENTION

It is an object of the present invention to provide an improved DC to DC converter circuit.

It is a feature of the present invention to provide an improved DC to DC converter having a bridge circuit coupled to the secondary winding of a transformer circuit.

It is still another feature of the present invention to provide a circuit coupled to the secondary windings of a transformer that is tuned in accordance with frequency applied to the primary circuit of the transformer.

It is yet another feature of the present invention to provide an improved quasi-resonant DC to DC converter.

SUMMARY OF THE INVENTION

The aforementioned and other features are obtained, according to the present invention, by a DC to DC converter having switching elements providing pulsed activation for the primary terminals of a transformer. Coupled to the secondary terminals of the transformer is a bridge network applying voltage to a capacitor and supplying current to a constant current source load. The capacitor and the leakage inductance of the transformer have values chosen to provide a resonant circuit at a frequency related to the frequency of the pulsed activation of the primary windings of the transformer. Other parameters for the transformer and the capacitor are selected to provide improved circuit operation.

These and other features of the present invention will be understood upon reading of the following description along with the drawings.

DESCRIPTION OF THE PREFERRED EMBODIMENT

1. Detailed Description of the Figures

Figure 1:
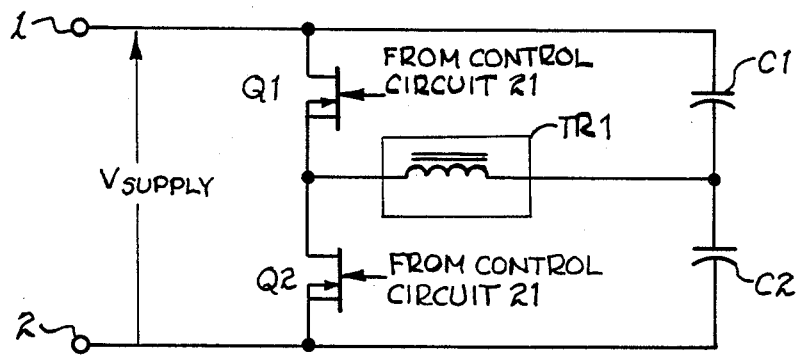
FIG. 1 is a schematic block diagram of the components on the primary portion of the transformer in a DC to DC converter of the present invention.

Referring now to FIG. 1, a block diagram of the circuit components coupled to the primary winding of a transformer TR1 is shown. A first terminal of $V_{SUPPLY}$ is coupled to a drain terminal of a field effect transistor Q1 and to a first terminal of capacitor C1. A second terminal of $V_{SUPPLY}$ is coupled to a source terminal of a field effect transistor Q2 and to a first terminal of capacitor C2. The drain terminal of transistor Q2 and the source terminal of transistor Q1 are coupled to a first primary winding terminal of transformer TR1, while a second primary winding terminal of transformer TR1 is coupled to second terminals of capacitors C1 and C2. The gate terminals of transistors Q1 and Q2 receive control signals from a control circuit.

Figure 2:
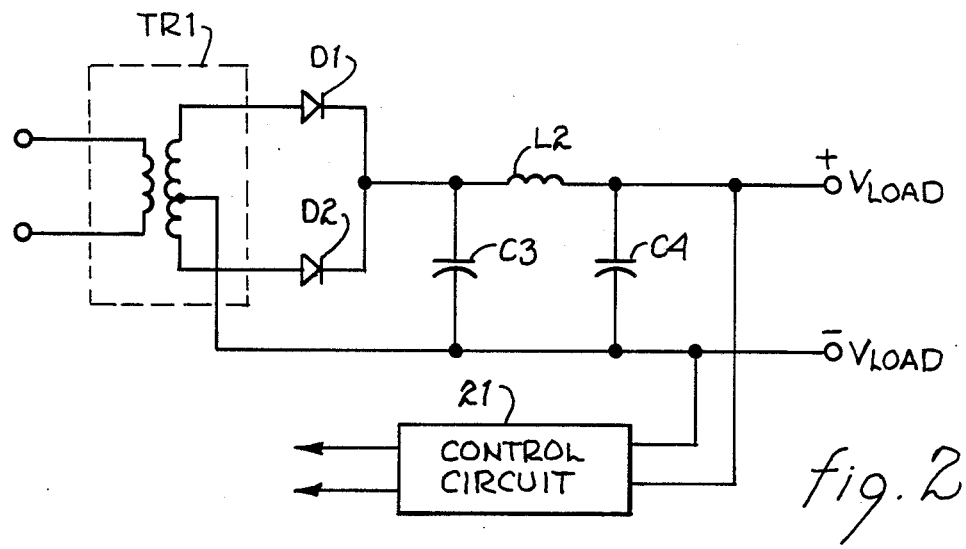
FIG. 2 is a schematic block diagram of the components on the secondary portion of the transformer in a DC to DC converter of the present invention.

Referring next to FIG. 2, a block diagram of the circuit components coupled to the secondary windings of transformer TR1 are shown. A first terminal of the secondary transformer TR1 winding is coupled to an anode terminal of diode D1, while a second terminal of the secondary transformer TR1 winding is coupled to an anode terminal of diode D2. A cathode terminal of diode D1 and a cathode terminal of diode D2 are coupled to a first terminal of capacitor C3 and to a first terminal of inductor L2. A second terminal of inductor L2 is coupled to a first terminal of capacitor C4, to a first $V_{LOAD}$ terminal and to control circuit 21. A third (center-tapped) terminal of the secondary transformer winding is coupled to a second terminal of capacitor C3, to a second terminal of capacitor C4, to a second $V_{LOAD}$ terminal and to control circuit 21. Control circuit 21 is coupled to the gate terminals of transistors Q1 and Q2.

Figure 3:
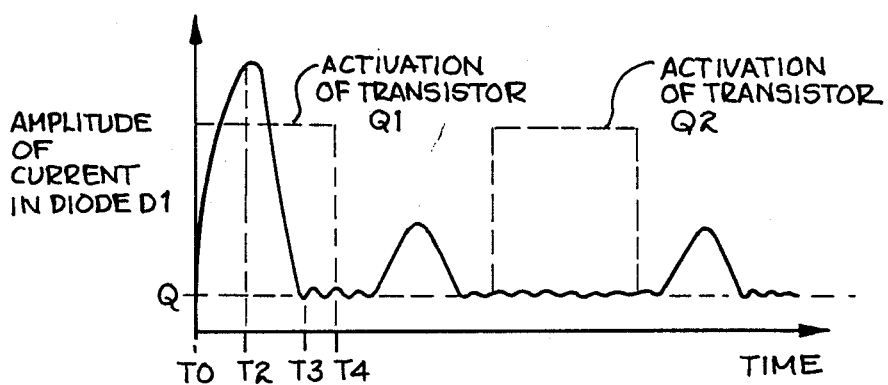
FIG. 3 is a diagram illustrating the amplitude of the current through diode D1, shown in FIG. 2, as a function of time.

Referring to FIG. 3, the current in diode D1 and the voltages applying the pulsed activation to the transistors Q1 and Q2 are shown as a function of time. At time T0, transistor Q1 has an activation voltage applied thereto and begins conduction. At time T2, during the activation of the transistor Q1, the current in diode D1 reaches a maximum value. At time T3, prior to the removal of the activation voltage from transistor Q1, conduction in diode D1 is terminated. And at time T4, the transistor Q1 has the activation voltage removed therefrom and ceases conduction. Current is also conducted through diode D1 between the activation of transistor Q1 and the activation of Q2.

Figure 4:
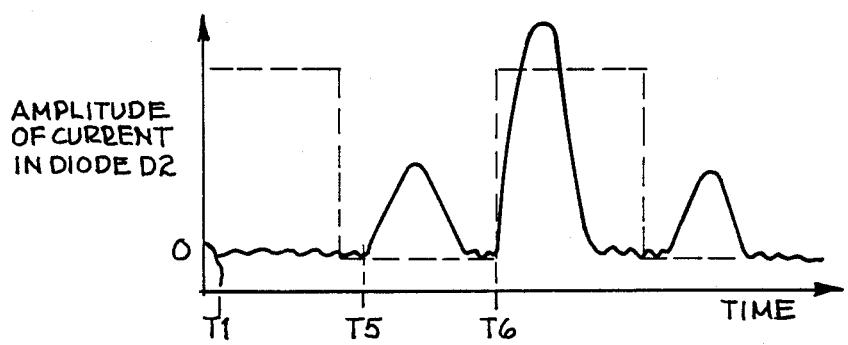
FIG. 4 is a diagram illustrating the amplitude of the current through diode D2, shown in FIG. 2, as a function of time.

Referring to FIG. 4, the current in diode D2 and the activation voltages for transistors Q1 and Q2 are shown as a function of time. In response to the activation voltage, transistor Q1 begins conduction at time T0 and terminates conduction at time T4. (At time T1, the conduction in diode D2 is halted when the current through diode D1 (c.f. FIG. 3) becomes sufficiently large.) The current through diode D2 reaches a maximum during the activation period of transistor Q2, and ceases conduction prior to the end of the activation period of transistor Q2. Current is also conducted in diode D2 between the activation of the transistor Q1 and the activation of transistor Q2.

Figure 5:
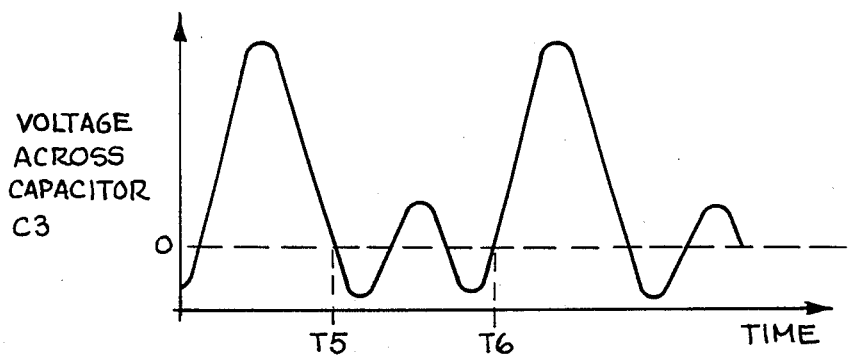
FIG. 5 is a diagram illustrating the amplitude of the voltage across capacitor C3, shown in FIG. 2, as a function of time.

Referring next to FIG. 5, the voltage across capacitor C3 is shown for the same time interval as illustrated in FIG. 3 and FIG. 4. Capacitor C3 is charged by the current through diode D1 and through diode D2 minus the charge flowing through inductor L2. At time T5, the voltage across capacitor C3 falls below zero and diodes D1 and D2 enter a free-wheeling (undriven) mode of conduction. At time T6, the transistor Q2 begins conduction resulting in the deposition of charge through diode D2 on capacitor C3.

Figure 6:
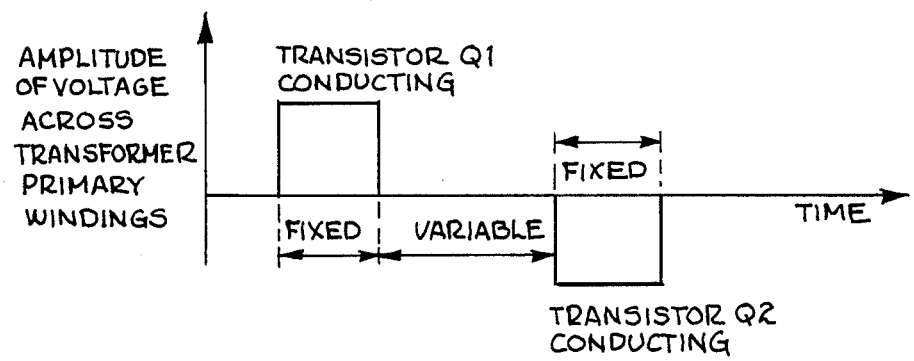
FIG. 6 is a diagram illustrating the activation of the primary terminals of the transformer by the control circuit as a function of time.

Referring to FIG. 6, the technique used by the control circuit 21 to regulate the energy applied to the primary terminals of the transformer is illustrated. The transistors Q1 and Q2, as a result of signals from control circuit 21, are conducting for fixed intervals. The time between the conducting periods of the transistors is variable. That is, to increase the power to the constant current source load 70, the time between conducting states of the transistors is shortened. To decrease the power to the load 70, the time between conducting state of the transistors Q1 and Q2 is lengthened. The determination of the period between conducting states of transistors Q1 and Q2 is determined by the load current applied to constant current source load 70.

Figure 7:
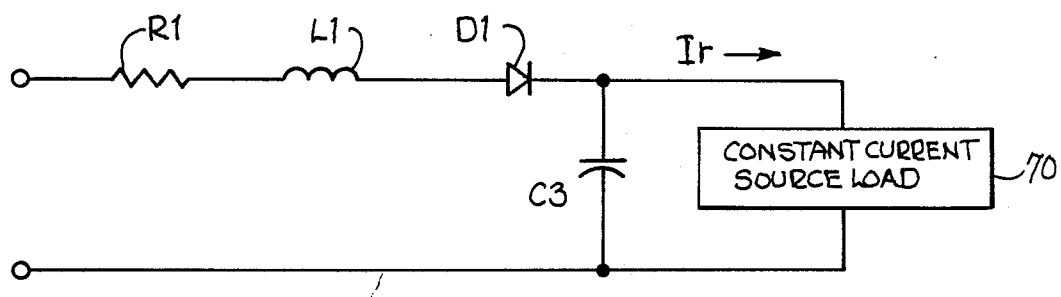
FIG. 7 is a schematic block diagram of the circuit components coupled to the secondary terminals of the transformer when I1 is positive.

Referring next to FIG. 7, the equivalent circuit of the secondary transformer TR1 circuit portion is shown for the time period when the current I1 through diode D1 is positive. A voltage determined by the characteristics of transistor Q1, in the conducting state, and the characteristics of the transformer TR1 is applied between the first and the center-tap terminal of the transformer TR1 secondary windings. The voltage causes current to flow through diode D1, through internal transformer resistance R1 and through the transformer leakage inductance L1. The current charges capacitor C3 which in turn provides current Ir to constant current source load 70.

Figure 8:
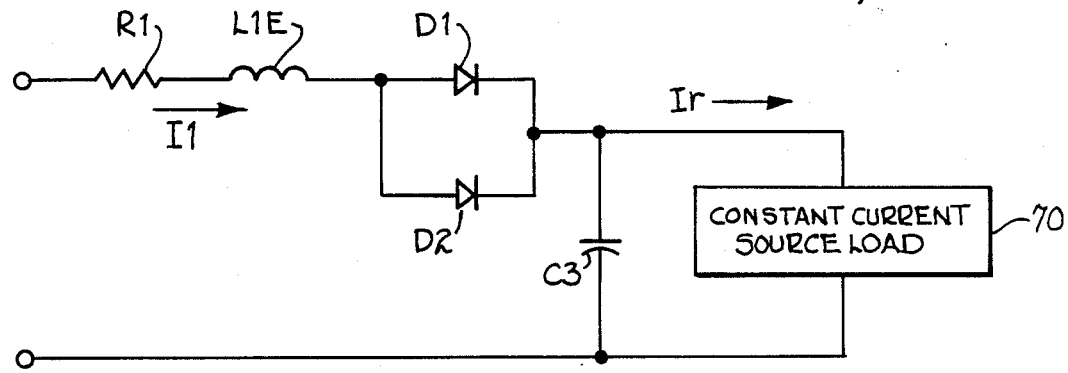
FIG. 8 is a schematic block diagram of the circuit components coupled to the secondary terminals of the transformer when transistor Q1 and transistor Q2 are not conducting.

Referring to FIG. 8, the equivalent circuit present when the primary terminals of the transformer TR1 are not energized (the recovery interval) is shown. Diodes D1 and D2 are shown in parallel for purposes of analysis. During this recovery interval, the inductor L2 (FIG. 2) maintains the flow of current to the constant current source load 70. This current continuation can discharge the capacitor C3 to the extent that the voltage across the capacitor C3 becomes negative. The negative voltage across the capacitor C3 causes current to flow through the transformer TR1 (and the equivalent resistor R1 and equivalent inductor L1E associated therewith) and through the diodes D1 and D2.

2. Operation of the Preferred Embodiment

The operation of the quasi-resonant circuit of the present invention can be understood in the following manner. Prior to the activation of transistor Q1, capacitor C3 has a negative voltage across the terminals and the output diodes D1 and D2 conduct equal currents in a non-driven (i.e. free-wheeling) mode of operation. At time T0, transistor Q1 is driven to the conducting state by application of signals from control circuit 21 and the transformer TR1 has approximately output voltage of $V_{SUPPLY}$ applied to the first primary terminal. The second primary terminal, coupled to capacitors C1 and C2, is approximately at one half the output voltage of $V_{SUPPLY}$ or 150 volts. The current in diode D1 begins to increase while the current in diode D2 decreases in accordance with the resonance frequency of the transformer leakage inductance L1 and capacitor C3. The sum of diode currents in diodes D1 and D2 charge the capacitor C3 and consequently supply current to the (approximately) constant current source load 70. At time T1, diode D2 no longer conducts current because of the increased voltage across the capacitor C3 as a result of the charging current through diode D1. At time T2, the current in diode D1 reaches a maximum value. At time T3, the current in diode D1 can no longer flow because of the relative values of the voltage across capacitor C3 and the voltage between the center-tapped terminal of transformer TR1 and the terminal of transformer TR1 to which diode D1 is coupled. At time T4, transistor Q1 ceases conduction because of the termination of the activation signal from control circuit 21. At time T5, capacitor C3 has discharged through inductor L2 to such an extent that the voltage across capacitor C3 is negative, forcing diodes D1 and D2 into conduction in a recovery mode of operation.

The control circuit 21 operates on a fixed time on and a variable time off mode of operation for the conduction of transistors Q1 and Q2, thereby controlling the power delivered to the constant current source load 70. Therefore regulation by the DC to DC converter is accomplished by controlling the time interval between activation pulses, i.e. the frequency of the activation pulses.

To repeat the cycle, transistor Q2 is activated at time T6 and the first primary terminal is essentially coupled to the negative terminal of $V_{SUPPLY}$. The current in diode D2 increases as the current in diode D1 decreases again in accordance with the equivalent impedances of the transformer TR1 and the impedance of capacitor C3. Thus, the power source $V_{SUPPLY}$ delivers power to the transformer each time that one of the transistors conducts current. Defining the following terms, V1 = the bipolar square wave equal to the voltage of the power bus divided by the transformer turns ratio N1, the power pulse time period being equal to the transistor Q1 period of conduction.
Ir = constant current load (approximation).
L1 = transformer leakage inductance with ½ the secondary shorted 2.5 inches from the transformer.
L1E = transformer leakage inductance with the full secondary shorted 2.5 inches from the transformer.
$V_{D1}$ = forward diode voltage drop.
$V_{C3}$ = voltage across resonant capacitor C3.
I1 = current through inductance L1.

Then $$V1(t) = V_{D1} + R1^*I1 + L1^*dI1/dT + V_{C3} \tag{1}$$

if I1 > 0 and for T0 > t > T3

$$I1 = C3^*dV_{C3}/dT + Ir \tag{2}$$

if I1 > 0 and for T0 > t > T3

Substituting equation 2 into equation 1 and neglecting the voltage drop across diode D1;

$$V1(t) = R1^*C3^*dV_{C3}/dT + Ir^*R1 + V_{C3} + L1^*C3^*d^{2-}V_{C3}/dT^2 \tag{3}$$

Equation (3) is a second order differential equation that has the following properties;

Resonant Frequency = $1/6.28^*(L1^*C3)^{\frac{1}{2}}$ and

Damping Coefficient = $R\frac{1}{2}^*(L1/C3)^{\frac{1}{2}}$

In the time interval T3 < t < T5, diode D1 is back-biased (i.e. nonconducting) while the voltage, $V_{C3}$, across capacitor C3 is decreasing. At time T5, both diodes, D1 and D2, become conducting as the voltage across the resonance capacitor C3 becomes negative. With both diodes conducting and the transformer output voltage having a negative value, the transformer output is virtually short-circuited across the full winding. Therefore, the equivalent inductance of the transformer is L1E. Theoretically, the inductance L1E should be ¼ L1 because the turns ratio for the operative embodiment is ½. As a practical matter, L1E is 40% of the inductance L1. In the time interval T5 < t < T6, the system is defined by the equation:

$$d^2V_{C3}/dt^2 + \{R/L1E\}*dV_{C3}/dt + V_{C3}/L1E*C3 + Ir*R/L1E*C3 = 0 \qquad (4)$$

Note that the voltage across resonant capacitor C3 rings (resonates) at a higher frequency because L1E is smaller than L1. More than one cycle resonance is possible because of the high Q of the circuit. This phenomenon can cause slight jumps in the average output voltage as the repetition rate is varied.

As pointed out above, the regulation of the output signal is maintained by controlling the time between power pulses. The load is assumed, as an approximation, to be a constant current load. Because the DC resistance of the output choke inductor, L2, is negligible, the average voltage across the capacitor C3 can be considered to be approximately equal to the average output voltage.

At the time T6, the transistor Q2 becomes conducting, and the cycle is repeated.

In order to optimize the circuit design, the component values are chosen in the following manner. The transformer TR1 turns ratio is selected to be the same as would be required in a fixed frequency pulse width modulator design as a first approximation. At low line voltage and full load power consumption, the DC to DC converter is operating at maximum operating frequency and the voltage across the resonant capacitor C3 is nearly sinusoidal in shape. The minimum value of the voltage across the resonance capacitor C3 is approximately −5.0 volts, while the peak voltage value across the resonance capacitor is equal to the bus voltage divided by the turns ratio N1. The peak voltage across a high Q resonant circuit is twice the DC excitation. However, the DC voltage seen by the transformer TR1 is divided by two because of the presence of the two capacitors C1 and C2, so that these two factors cancel. The ratio of the output load impedance divided by the converter surge impedance should be approximately 1.0 to maintain sinusoidal transformer currents. (The converter surge impedance is defined as one half the square root of the transformer output leakage inductance L1 divided by the resonance capacitor C3). The transformer leakage inductance must be controlled to a ±15% tolerance and have a tank frequency with capacitor C3 of 1.15 times the maximum permitted drive frequency. Capacitor C3 is selected to be a polyproplylene film capacitor. This capacitor should have an internal resonant frequency at least four times the resonant frequency of the secondary transformer circuit and be able to accommodate an RMS current of 41% of the output load current at the circuit resonant frequency. Selection of the component values in this manner permits the charging of the capacitor C3 within the time period of the transistor (Q1 or Q2) activation. These values also permit discharging of the capacitor C3 during the period when neither transistor Q1 or transistor Q2 is conducting.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A DC to DC converter for driving a load impedance, said DC to DC converter comprising:

a transformer having a primary winding and a center-tapped secondary winding;

pulse means for applying alternately positive and negative current pulses to said primary transformer winding, each of said current pulses having a generally constant duration;

a first diode coupled to a first transformer secondary winding terminal;

a second diode coupled to a second secondary transformer winding terminal;

a first capacitor having a first terminal coupled to said first and second diodes and a second terminal coupled to said center-tap of said secondary winding, wherein said first capacitor and one half of a transformer secondary leakage inductance provide a resonance frequency having a period less than twice said constant duration;

an inductor having a first terminal coupled to said first terminal of said first capacitor and a second terminal coupled to a first terminal of a load impedance; wherein a second terminal of said load impedance is coupled to said second terminal of said first capacitor;

a second capacitor coupled in parallel with said load impedance; and control means responsive to said load impedance for controlling said pulse means, wherein power to said load impedance is controlled by varying an interval between said constant duration pulses, wherein said second capacitor and said inductor have values chosen in conjunction with said load impedance and said first capacitor to provide conduction through said first diode and said second diode during said interval.

2. The DC to DC converter of claim 1 wherein said capacitor is charged by said conduction through said first diode and said second diode during a period when no current pulse is present in said transformer.

3. The DC to DC converter of claim 1 wherein said load impedance, said inductor, and said second capacitor provide a constant current load.

4. The DC to DC converter of claim 1 wherein said first capacitror (C) and said leakage conductance (L) of said transformer secondary winding have a resonant frequency f determined by the relationship:

$$1/f = 6.28*(L*C)^{\frac{1}{2}}.$$

5. The method for providing a DC to DC conversion for supplying power to a load impedance, said method comprising the steps of;

applying constant duration alternately positive and negative current pulses having a controllable interpulse interval to input terminals of a transformer;

applying current from a first output terminal of said transformer through a first diode to a first terminal of a first capacitor during said positive current pulses;

applying current from a second output terminal of said transformer through a second diode to said first terminal of said first capacitor during said negative current pulses;

coupling a center-tap terminal of said transformer to a second terminal of said first capacitor;

coupling an inductor to said first terminal of said first capacitor and through a load impedance to said second terminal of said first capacitor;

coupling a second capacitor in parallel with said load impedance;

controlling said interpulse interval by a feedback apparatus responsive to current through said load impedance for controlling power to said load impedance;

selecting said first capacitor along with leakage inductance for said transformer having one half the secondary winding shorted to provide a resonant frequency having a period of less than twice said constant duration of said current pulses; and selecting inductor and said second capacitor values in relation to said load impedance and said first capacitor value to apply current through said first diode and said second diode to said first terminal of said first capacitor during said interpulse interval.

6. The DC to DC conversion method of claim 5 wherein said selecting step includes selecting said first capacitor C to have, along with said transformer leakage inductance L, a resonant frequency f according to the relationship $1/f = 6.28*(L*C)^{\frac{1}{2}}$.

7. The DC to DC conversion method of claim 6 wherein said first capacitor is charged during said interpulse interval by current through said first and said second diodes.

8. A DC to DC converter for driving a load impedance, said DC to DC converter comprising:

a transformer having a center-tapped secondary winding;

activation means for applying alternating positive and negative current pulses having a constant duration to a primary winding of said transformer;

a first capacitor having a first terminal coupled to a center-tapped terminal of said transformer;

a first diode coupled between a second terminal of said first capacitor and a first terminal of said secondary transformer winding;

a second diode coupled between said second terminal of said first capacitor and a second secondary transformer terminal, wherein said first capacitor is chosen in relationship to said transformer to have a resonant frequency having a preselected period, said preselected period being less than twice a duration of said constant duration current pulses applied to a primary winding of said transformer, wherein power delivered to said first capacitor is controlled by controlling an interval between said constant duration current pulses;

an inductor having a first terminal coupled to said second terminal of said first capacitor and having a second terminal coupled through a load impedance to said first terminal of said first capacitor; and a second capacitor coupled in parallel with said load impedance, said second capacitor and said inductor values selected relative to said first capacitor value and said load impedance to provide conduction through said first diode and said second diode during said interval.

9. The DC to DC converter of claim 8 wherein said first capacitor is charged during said current pulses by current through a one of said first diode and said second diode.

10. The DC to DC converter of claim 9 wherein said first capacitor is charged by current through said first diode and said second diode during said interval.

11. The DC to DC converter of claim 9 wherein said interval between said current pulses is determined by a current through said load impedance.

12. The DC to DC converter of claim 11 wherein said activation means includes a first and a second field effect transistor, said current pulses resulting from conduction in said transistors.

13. The DC to DC converter of claim 8 wherein said first capacitor C and said leakage conductance L of said transformer secondary winding are chosen to have a resonance frequency f determined by a relationship:

$$1/f = 6.28*(L*C)^{\frac{1}{2}}.$$

14. The DC to DC converter of claim 10 wherein said load impedance, said inductor, and said second capacitor provide a constant current load.

* * * * *